United States Patent [19]

Saint Marcoux

[11] 4,424,552

[45] Jan. 3, 1984

[54] CONDENSER BLOCK AND VOLTAGE MULTIPLIER COMPRISING SUCH A CONDENSER BLOCK

[75] Inventor: Roland Saint Marcoux, Bagnolet, France

[73] Assignee: L.C.C.-C.I.C.E. Compagnie Europeene de Composants Electroniques, Bagnolet, France

[21] Appl. No.: 383,163

[22] Filed: May 28, 1982

[30] Foreign Application Priority Data

Jun. 5, 1981 [FR] France ................. 81 11218

[51] Int. Cl.$^3$ ............... H01G 1/14; H01G 4/38
[52] U.S. Cl. ................. 361/306; 361/330
[58] Field of Search ........... 361/301, 306, 308, 309, 361/328, 321, 330

[56] References Cited

U.S. PATENT DOCUMENTS

| | | | |
|---|---|---|---|
| 2,608,601 | 8/1952 | Boardman | 361/330 |
| 3,496,434 | 2/1970 | Prokopowicz | 361/330 X |
| 4,389,703 | 6/1983 | Morel et al. | 361/328 X |

FOREIGN PATENT DOCUMENTS

| | | | |
|---|---|---|---|
| 2533368 | 2/1976 | Fed. Rep. of Germany | 361/330 |
| 2437688 | 4/1980 | France | 361/330 |
| 1405081 | 9/1975 | United Kingdom | 361/330 |

*Primary Examiner*—Donald A. Griffin

[57] ABSTRACT

A condenser block comprising a stack of insulating layers, separated by metal plates, arranged in relation to one another in such a way that at least part of each metal plate is approximately opposite at least part of another plate, in the direction of stacking, these metal plates forming the condenser plates. In this invention, one metal plate, positioned between any pair of insulating layers, and opposite a second metal plate, placed above the first such plate, between a second pair of insulating layers, faces a third metal plate, also placed above the first plate, between a different pair of insulating layers from the second such pair.

5 Claims, 6 Drawing Figures

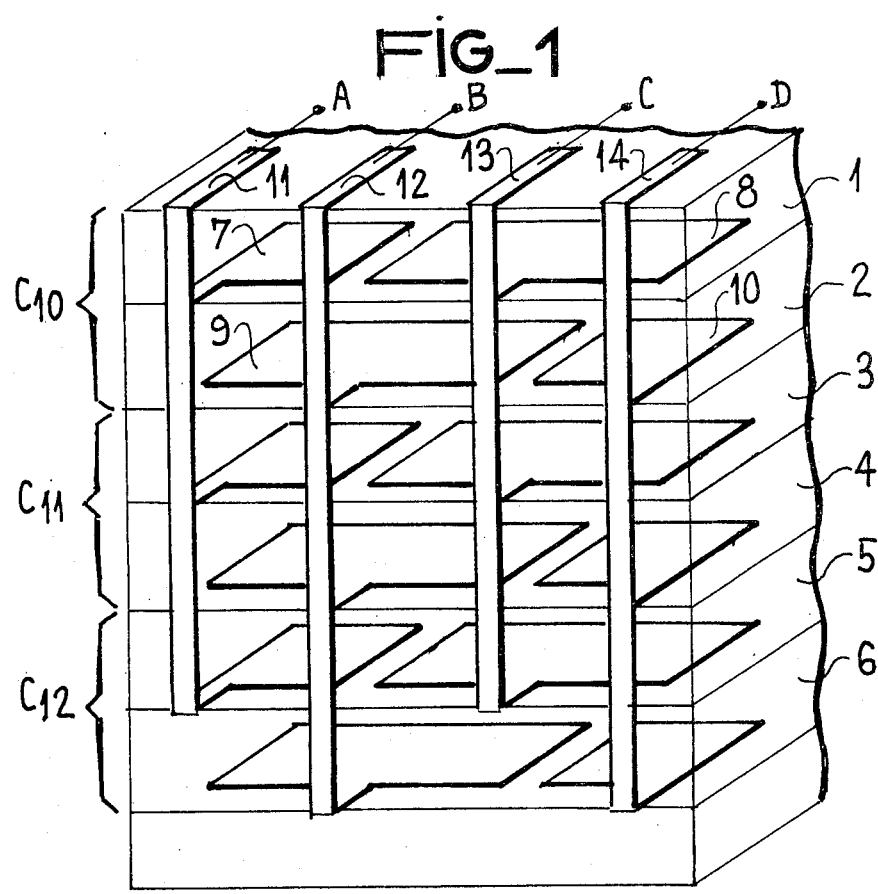
FIG_1
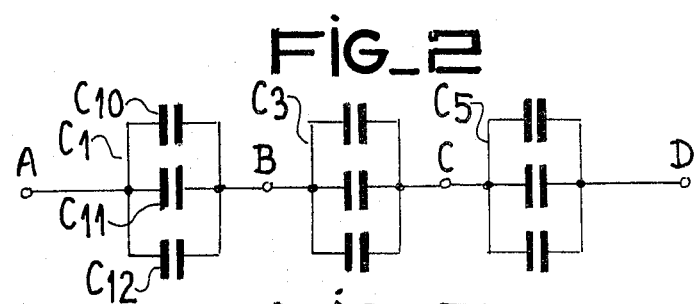
FIG_2
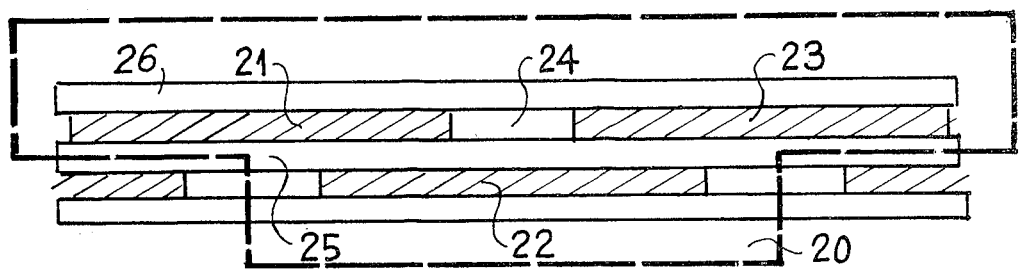
FIG_3

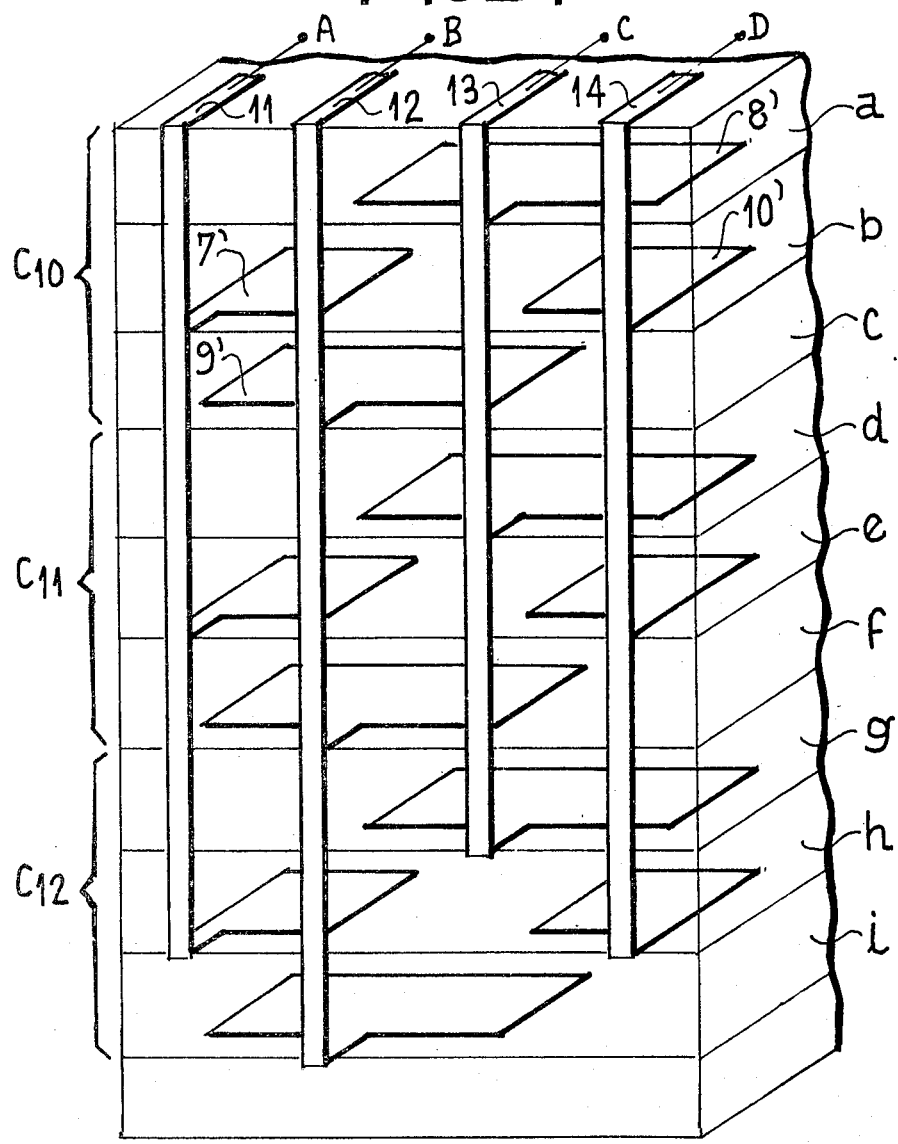

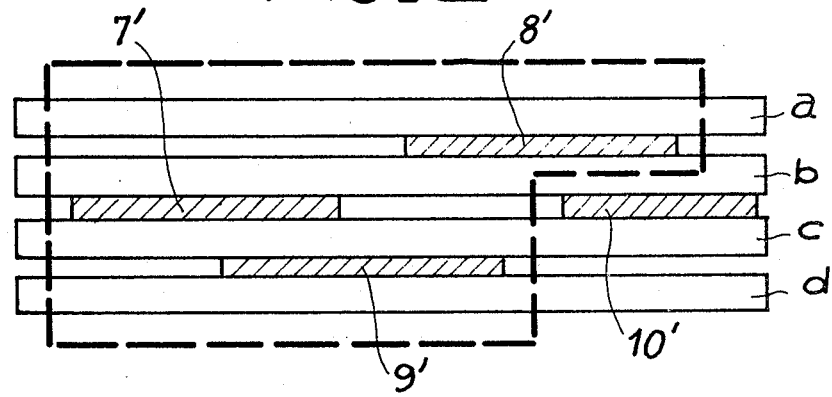
FIG_5
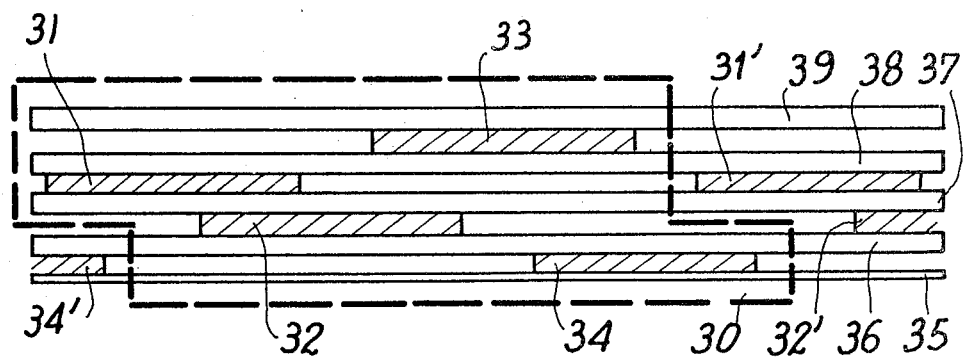
FIG_6

CONDENSER BLOCK AND VOLTAGE MULTIPLIER COMPRISING SUCH A CONDENSER BLOCK

This invention concerns a condenser block comprising a stack of dielectric layers, separated by metal plates, so positioned in relation to one another that at least part of each such plate is approximately opposite at least part of another such plate, in the direction of stacking. These metal plates form the condenser plates. Such condenser blocks are more specifically intended to form part of voltage multipliers, which enable a higher direct-current voltage than the input alternating-current voltage to be obtained, and which are used, for example, in high-voltage d.c. generators, or in television sets, where they maintain a high voltage at the cathode-ray tube anode.

These voltage multipliers contain two rows of series-mounted capacities and a number of diodes interconnecting the capacities in each row, possibly using the conventional Greinacher Ladder mounting. The diodes are connected in series, so that the alternating current is one-directional, charging each capacity. In order to construct a voltage multiplier, active and passive components are therefore assembled in accordance with the multiplier diagram, then moulded, to form a block containing different materials side by side.

However, when the multiplier is in operation, these materials react differently to climatic heat and electrical conditions, and to aging; this sets up stresses, causing changes in properties, and making components perform less satisfactorily. To obtain a voltage multiplier, consequently, a homogeneous block of condensers is constructed, divided into two separate groups of condensers, after which a recess is made in the part of the block between the two groups, to contain the diodes interconnecting the condensers in the two groups.

One embodiment of these condenser blocks has been described in French patent application no. 80 03 046. ("Integrated voltage multiplier"), filed on behalf of Thomson-CSF and LCC-CICE on Feb. 12, 1980 corresponding to U.S. Pat. No. 4,389,703 issued June 21, 1983. According to this description, a homogeneous block of series-mounted condensers, for use in a voltage multiplier with multi-layer ceramic structure, is obtained by carrying out a sequence of operations: metal-plating thin sheets of ceramic insulator, in such a way that each side of a sheet comprises a number of areas of metal forming condenser plates or electrodes, these areas being so arranged that every second such area forms a condenser plate common to two condensers mounted in series; stacking these plated sheets in such a way that the condenser plates are opposite one another; making parallel connections among the various plates in parallel, to match their positions following stacking of the plated sheets, such connections being obtained by partial plating on the outside of the block; fritting the ceramic material. The resulting block forms a group of series-mounted integrated condensers, each condenser comprising a number of parallel-mounted elementary condensers. In this embodiment, the dielectric layers are thin sheets of insulating ceramic material, and the metal plates are metallized coatings on these sheets. However, this arrangement of the condenser plates has the disadvantage that two metal plates which may have high potential difference are left in proximity: two series-mounted condensers comprise three metal plates, a common one, and two end ones; at least one area of which is opposite an area on the common plate. The end plates, placed between the same two insulating layers, are quite close to each other, because of this structure, and they may present a high potential difference, which could cause breakdown between them.

This invention overcomes such drawbacks, being characterized by the fact that one metal plate, positioned between one pair of insulating layers, and facing part of a second metal plate, placed above it and between a second pair of insulating layers, faces part of a third metal plate, placed above the first metal plate between a third pair of insulating layers, and that the second and third pairs do not have more than one insulating layer in common.

The first plate acts as the common plate, while the end plates are the second and third ones. In this invention, the second plate is separated from the third by one or more insulating layers.

The basic module of the condenser block is the arrangement of metal plates and insulating layers, which, when repeated in succession, forms the whole block. Similarly, vertical or horizontal repetition of the basic module involves its repetition perpendicular or parallel respectively to the insulating layers.

In one recommended embodiment of the invention, the basic cell comprises n metal plates (n being at least equal to 3), offset in relation to one another, and opposite one another successively, the plate n being separated from plate $(n-1)$ by $(n-1)$ insulating layers, of which $(n-2)$ are insulating layers between plates $(n-1)$ and $(n-2)$. Accordingly, by repeating this basic module whenever necessary, it avods placing two metal plates, which may present a high potential difference, close to each other between the same two insulating layers. The higher n is, the smaller the number of plates per unit of volume; the higher the risk of breakdown, the higher the value of n will be selected, in order to place greater distance between metal plates positioned between the same pair of insulating layers.

However, for normal condensers constructed by one skilled in the art, the only significant risk of breakdown affecting operation of a series-mounted condenser block arises between two metal plates opposite the same plate. This can be explained by the fact that two metal plates not opposite the same metal plate are far enough away from each other for breakdown to be unlikely under normal conditions of use. Consequently, n is preferably low.

Where n equals 3, the basic cell of the block comprises three metal plates, offset from one another and opposite one another successively, the second such plate being separated from the first by one insulating layer, and the third plate being separated from the second by two insulating layers, one of which is the preceding layer: in other words, part of the second plate faces part of the first plate, through an insulating layer, and part of the third plate faces part of the first plate through two insulating layers, one of which is the preceding layer. Voltage resistance of the series-mounted condenser block is thereby improved, without any significant effect on other advantages of the condenser used in an integrated voltage multiplier defined in the prior art. The additional insulating layers hardly increase the size of the multiplier. Furthermore, variation in the surface-area of the metal plates allows capacitances to be adjusted to the desired levels, and more specifically to set all capacitances to the same level, even where the number of intervening insulating layers varies.

When n equals 4, the basic module comprises four metal plates, offset from one another, and facing one another successively, the first such plate being separated from the second plate by an insulating layer, the third plate being separated from the second plate by two insulating layers, one of which is the preceding layer, and the fourth metal plate being separated from the third by three insulating layers, two of which are the preceding two layers. Voltage resistance of the condenser block is thereby improved.

The invention is more specifically used in type I or type II ceramic condensers. Insulating layers may also be made from plastic, such as polystyrene, polycarbonate, ethylene polyterephthalate or polypropylene.

The invention will be made clearer from the following description of one of the possible embodiments, illustrated by the accompanying figures:

FIG. 1, showing a homogeneous block of series-mounted condensers, based on the prior art;

FIG. 2, showing the corresponding electrical diagram of the block in FIG. 1;

FIG. 3, showing the basic module of the homogeneous condenser block in FIG. 1;

FIG. 4, showing this new homogeneous series-mounted condenser;

FIG. 5, showing the basic module of the homogeneous condenser block in FIG. 4;

FIG. 6, showing another basic module.

FIG. 1 shows a series-mounted condenser block from the prior art, made in the form of a ceramic block, using the multilayer technique. Such a block is made from thin sheets of insulating material, for exampl some 10 to 150 $\mu$m thick, with sufficient voltage resistance per millimeter, possibly 5 or 10 times greater that that of heavy insulating materials, more than 1 mm thick, often used to manufacture condensers. These thin sheets of ceramic insulators are plated with palladium, silver-palladium, gold-palladium, nickel or other metals, to a thickness of 1 to 2 $\mu$m, in an arrangement that forms several condensers. They are then stacked together, and pressed to form a homogenous block, containing a group of series-mounted condensers. The equivalent electrical diagram is shown in FIG. 2, which shows that each condenser C1, C3 and C5, is formed of several elementary condensers-three in this example, mounted in parallel, since a single condenser would not have the necessary capacitance. Plating of each sheet of ceramic insluating material 11 to 6 produces at least two metal plates 7 and 8, of different surface-areas, on sheet 1, and another two 9 and 10 on sheet 2. Plate 7 is square, and plate 8 is rectangular, with double the surface area of plate 7. Plate 7 forms one elementary condenser plate, this condenser itself forming the outer plate of condenser C1 (7), while plate 8, with double the surface-area, forms the series-mounted plates of condensers C3 and C5. In the same way, rectangular plate 9, with double the surface-area of plate 8, forms the series-mounted plate of both condensers C1 and C3, while plate 10 forms the right-hand plate of condenser C5. These arrangements are reproduced alternately on the other sheets 3, 4, 5 and 6. When these two types of plated sheets are stacked together, the elementary condenser plates forming condensers C1, C3 and C5 are properly positioned. After stacking, namely when the insulating ceramic sheets have been placed in position and the condensers formed, the various elementary condenser plates are interconnected, and connected to the outside surfaces of the block, by external plating, as shown in FIG. 1. The metal plate 11 forms the connection between input terminal A and the first left-hand plate of condenser C1 in FIG. 2, while metal plate 13 forms the connection between the right-hand plate of condenser C3 and the left-hand plate of condenser C5, culminating at point C, and metal plate 14 forms the connection between the right-hand plate of condenser C5 and the output terminal.

FIG. 2 shows the electrical diagram of the block illustrated in FIG. 1.

FIG. 3 illustrates the basic module 20 of the series-mounted condenser block, in other words the combination of metal plates 7, 8, and 9, corresponding in this figure to metal plates 21, 23 and 22 respectively. This basic module 20 can obviously be repeated horizontally and vertically. Plates 21, 22 and 23 are the same size, to allow horizontal repeatability. At the end of the series, plates will be half the size.

The space between plates 21 and 23 is in fact a very thin layer of air. This is because the insulating layers 25 and 26 are subjected to such pressure that they encroach into this space. This juxtaposition of layers 25 and 26 inside the space 24 weakens voltage resistance between plates 21 and 23.

FIG. 4 shows the new series-mounted condenser block, made in the form of a ceramic block, using the multi-layer technique. The same references are used for the same components as in FIG. 1. The corresponding electrical diagram is also shown in FIG. 2. The insulating sheets a to i are metal-plated, using the same techniques as for the sheets 1 to 6. The resulting metal plates 7', 8', 9', 10' have the same geometrical characteristics as 7, 8, 9 and 10, and perform the same electrical function. Structural organisation is as follows: metal plates 7' and 9', situated on two insulating sheets c and d, as in FIG. 1, are opposite each other. Consequently, metal plate 8', opposite plates 9' and 10', is situated on an insulating sheet b added to sheet c, surmounted by plate 7', so that it is separated from plate 9' by two insulating sheets b and c, instead of only one as in FIG. 1. Metal plate 10', opposite plate 8', is situated on the same insulating sheet c as plate 7'. Consequently, going upwards, there is insulating sheet d with metal plate 9', insulating sheet c with metal plates 7' and 10', and insulating sheet b with metal plate 8'. In other words, a single insulating sheet c can support more than one metal plate, two in this case. However, these two metal plates 7' and 10' are not opposite any part of a common plate, and are also separated by a half-width of metal plates 9' and 84, which is enough to rule out any likelihood of breakdown. The distance between them is enough to ensure proper voltage resistance of the block, certainly higher in any case than for the block illustrated in FIG. 1. The module formed by these three insulating sheets, surmounted by metal plates 7', 8', 9' and 10', can be repeated vertically, as illustrated in FIG. 4. But the module formed by the three insulating sheets b, c and d, surmounted by metal plates 7', 8' and 9', can also be repeated horizontally, in which case plate 10' performs the same function as plate 7'. This is the basic module of the condenser block in FIG. 4, comprising insulating sheets b, c and d, surmounted by metal plates 7', 8' and 9'. This arrangement increases the voltage resistance of the block by a factor of 1.2 to 2.

FIG. 5 shows the basic module of the condenser block in FIG. 4, with the same references for the same components. Metal plates 7' and 10' are shown the same size as plates 8' and 9', since horizontal repetition is not cut off as in FIG. 4. The basic module in this figure can be seen to correspond to the basic module described above containing n plates, where n equals 3.

FIG. 6 shows one possible arrangement of the basic module 30, horizontally and vertically repeatable. The module comprises four metal plates 31, 32, 33 and 34 and five insulating layers. Plates opposite one another are offset parallel to the insulating layers, each one in relation to the following one. The module comprises successively plates 31 and 32, separated by insulating layer 37, plates 32 and 33, separated by insulating layers 37 and 38, plates 33 and 34, separated by insulating layers 38, 37 and 38. A final insulating layer 35 is provided underneath this arrangement. This basic module corresponds to the module described above containing n plates, where n equals 4. It is therefore possible to place, opposite plate 34, an insulating layer 31', between the same two insulating layers as plate 31, and rebuild the arrangement described earlier. Vertical repetition is also possible. In addition, variation in the surface-area of the metal plates enables capacitances to be set to the required levels, and more specifically to set all capacitances to the same level, even where the number of intervening insulating layers differs.

What is claimed is:

1. A condenser block comprising a stack of insulating layers, separated by metal plates, arranged in relation to one another in such a way that at least part of each such plate is approximately opposite at least part of another such plate, in the direction of stacking, the said metal plates forming the condenser plates and the said block being characterized by the fact that one metal plate, positioned between one pair of insulating layers, and opposite part of a second metal plate, placed above the first plate, between a second pair of insulating layers, is also opposite part of a third metal plate, between a third pair of insulating layers, and that the second and third pairs have not more than one insulating layer in common.

2. A condenser block as defined in claim 1, comprising a number of basic modules, each of which contains n metal plates, n being not fewer than 3, offset in relation to one another, and successively opposite one another, plate n being separated from plate (n−1) by (n−1) insulating layers, of which (n−2) layers are placed between plates (n−1) and (n−2).

3. A condenser block as defined in either claim 1 or 2, comprising a number of basic modules, each of which contains three metal plates, offset in relation to one another, and successively opposite one another, the second plate being separated from the first plate by one insulating layer, and the third plate being separated from the first plate by two insulating layers, one of which is the preceding layer.

4. A condenser block as defined in either claim 1 or 2, comprising a number of basic modules, each of which contains four metal plates, offset in relation to one another, and successively opposite one another, the first plate being separated from the second plate by one insulating layer, the third plate being separated from the second plate by two insulating layers, one of which is the preceding layer, and the fourth plate being separated from the third plate by three insulating layers, two of which are these preceding layers.

5. A voltage multiplier comprising a condenser block as defined in any one of claims 1 or 2.

* * * * *